US009828189B2

United States Patent
Tillman et al.

(10) Patent No.: US 9,828,189 B2
(45) Date of Patent: *Nov. 28, 2017

(54) DEVICE FOR TURNING OVER AN OBJECT

(71) Applicant: Windmoller & Holscher KG, Lengerich (DE)

(72) Inventors: Guido Tillman, Ochtrup (DE); Alexander Titz, Bielefeld (DE)

(73) Assignee: WINDMOLLER & HOLSCHER KG, Lengerich (DE)

( * ) Notice: Subject to any disclaimer, the term of this patent is extended or adjusted under 35 U.S.C. 154(b) by 190 days.

This patent is subject to a terminal disclaimer.

(21) Appl. No.: 14/172,492

(22) Filed: Feb. 4, 2014

(65) Prior Publication Data

US 2014/0219765 A1    Aug. 7, 2014

(30) Foreign Application Priority Data

Feb. 5, 2013 (DE) .................. 10 2013 101 148

(51) Int. Cl.
  *B65G 47/252* (2006.01)
(52) U.S. Cl.
  CPC ................... *B65G 47/252* (2013.01)
(58) Field of Classification Search
  CPC ...... B65G 47/252; B65G 47/22; B65G 47/24; B65G 47/244; B65G 2207/04; B65G 29/00; B65H 2301/33214; B65H 15/02; B65H 15/00; B65H 2301/33212; B65H 2301/33224; B65H 2301/42112
  (Continued)

(56) References Cited

U.S. PATENT DOCUMENTS 2,865,516 A    12/1958  Hedderich
2,952,944 A *   9/1960  Given ................ C03B 35/26
                                                         414/431
(Continued)

FOREIGN PATENT DOCUMENTS

DE    1047713 B    12/1958
DE    19931145 A1   1/2001
(Continued)

OTHER PUBLICATIONS

European Patent Office: Office Action dated Sep. 15, 2016 for EP application No. 14 154 027.8 (Partial Translation of Office Action Attached).

(Continued)

*Primary Examiner* — Anna M Momper
*Assistant Examiner* — Lynn E Schwenning
(74) *Attorney, Agent, or Firm* — Agris & Von Natzmer, LLP; Joyce Von Natzmer

(57) ABSTRACT

A device for turning over an object, particularly a package of stacked sacks, having a holder device for the purpose of receiving, turning over, and releasing the object, the holder device including two transport elements for conveying the object, and having a rotary device for rotating the transport elements about a stationary axis of rotation, the rotary device including a rotatable frame to fasten the transport elements on both sides thereof, where the transport elements are fastened to the frame in a manner allowing movement, where the rotary device has a rotary drive which drives the frame on both sides.

38 Claims, 4 Drawing Sheets

(58) Field of Classification Search
USPC ....... 414/758, 759, 763, 764, 766, 771, 777, 414/783
See application file for complete search history.

(56) References Cited

U.S. PATENT DOCUMENTS

| | | | |
|---|---|---|---|
| 2,984,364 A | | 5/1961 | Lamb |
| 3,184,079 A | | 5/1965 | Buccicone |
| 3,617,054 A | * | 11/1971 | Schilling ................ B65H 29/28 271/184 |
| 3,705,655 A | * | 12/1972 | Fahrenholz .......... B65G 47/248 198/412 |
| 3,710,955 A | | 1/1973 | Redman |
| 4,354,788 A | * | 10/1982 | Giusti ....................... B41F 1/52 198/404 |
| 4,798,278 A | * | 1/1989 | Cornacchia .......... B65G 47/252 198/399 |
| 6,142,287 A | * | 11/2000 | Biffert .................. B65G 47/252 198/402 |
| 6,793,454 B2 | * | 9/2004 | Brizzi .................... B65H 15/02 414/765 |
| 7,114,436 B1 | * | 10/2006 | Mueller ................ B21D 55/00 100/269.02 |
| 2012/0037475 A1 | * | 2/2012 | Baccini ................ B65G 49/061 198/379 |
| 2012/0099956 A1 | * | 4/2012 | Diehr ...................... B65H 1/30 414/728 |
| 2012/0163952 A1 | * | 6/2012 | Hsu ........................ G01N 21/95 414/763 |

FOREIGN PATENT DOCUMENTS

| | | | |
|---|---|---|---|
| DE | 20219892 U1 | 3/2003 | |
| DE | 102008017420 A1 | 10/2009 | |
| EP | 1971540 B1 | 11/2009 | |
| GB | 1305270 A | 1/1973 | |
| GB | 1585830 | 3/1981 | |
| WO | WO 2010/094346 | * 8/2010 | ............. B65G 49/06 |

OTHER PUBLICATIONS

European Patent Office: Office Action dated Sep. 15, 2016 for EP application No. 14 154 027.8 (Partial Translation of Office Action Attached), Discussion of D1 (= Foreign Patent Documents 1, above).

* cited by examiner

DEVICE FOR TURNING OVER AN OBJECT

TECHNICAL FIELD

The invention relates to a device for turning over an object, particularly a package of stacked sacks.

BACKGROUND

Devices for turning over objects are used in the transport and palletting of packages of stacked sacks. In this case, it sometimes happens that the sacks are not lying flat on top of each other, and the packages therefore sink in the middle. This can particularly occur if the sacks have folded bottoms or valves on their ends. In order to nonetheless obtain the flattest possible surface of such packages during palletting, it is therefore sometimes necessary to turn over the packages.

In conventional devices, the packages are gripped and turned between two height-adjustable transport plates. In this case, the transport plates are arranged on a frame between two frame elements, and are fastened to these frame elements in a manner allowing sliding, generally by means of guide rails. The frame elements are rotated by a drum drive and therefore turn the transport plates. Typically, the drum drive only engages on one side with the frame to move only one of the frame elements. The frame elements must therefore be connected by at least one torsion-resistant connection element, which makes it possible for the rotation movement to be transmitted from the frame element on the input side to the second frame element which is opposite the rotary drive. In this case, it has proven disadvantageous that the transport plates can be easily deflected out of the guide rail which is farther from the rotary drive, during the rotation of the frame elements, due to their inertia, and that the transport plate can even fall off the frame.

A device for turning over an object is known from DE 199 31 145 A1, designed with a holder device for the purpose of receiving, turning over, and releasing the object, and a rotary device for the purpose of turning over the holder device. The holder device in this case has two transport elements which can grip the object, wherein the transport elements can be turned over by means of the rotary device. The rotation device is designed with two frame elements which clasp around the transport elements on both sides. Guide rails are included on the frame elements, and the transport elements are arranged in said guide rails in a manner allowing movement. DE 199 31 145 A1 also includes a drum drive for the purpose of rotating one of the frame elements. In this case, it could be disadvantageous that the frame elements need to be connected by heavy, large elements in order to evenly transmit the rotary movement to the transport elements. In addition, it could be disadvantageous that the transport elements can be deflected out of the guide rails during the rotary movement, and the object can fall out.

BRIEF SUMMARY

The problem addressed by the invention is therefore that of providing an improved device for turning over an object, particularly a package of stacked sacks, which overcomes the disadvantages named above. In particular, the problem addressed by the invention is that of creating a device for turning over an object, which enables reliable and stable turning of the object. The device should have a simple construction, require few components, and reduce the amount of material required.

The invention suggests a device for turning over an object, particularly a package of stacked sacks, having a holder device for the purpose of receiving, turning over, and releasing the object, said holder device comprising two height-adjustable transport elements for the purpose of conveying the object, and having a rotary device for the purpose of rotating the transport elements about a stationary axis of rotation, said rotary device comprising a rotatable frame to fasten the transport elements on both sides thereof, wherein the transport elements are fastened to the frame in a manner allowing movement, and wherein the rotary device has a rotary drive, which drives the frame on both sides.

In contrast to a conventional, single-sided rotary drive, it is particularly advantageous that the frame can be driven simultaneously from two sides by a rotary drive to which the transport elements are fastened. As such, it is possible to realize a stable rotary movement of the transport elements. In this case, the rotation speed of the frame can be increased while the rotary drive output remains constant. The rotary device according to the invention also does not require heavy, torsion-resistant connection elements to stabilize the frame and to transmit the rotary movement evenly along the transport elements. The transport elements can therefore be reliably held on both sides, on the frame, during the rotary movement. In contrast to a single-sided rotary drive, the device can not only have a more stable design, but also a lighter design—wherein the energy consumption for turning over the object can be reduced at an increasing rotary speed.

According to the invention, the holder device can have a transport drive for the purpose of driving the transport elements, and therefore of conveying the object. The transport drive in this case can be fixed to a housing of the device or can be fastened on the frame in a manner allowing it to move with the frame. The transport drive enables, in addition to the rotary drive, a configuration wherein the object can be conveyed in a transport drive, while the rotary drive can be included exclusively for turning the transport elements. The device according to the invention can advantageously be designed as an assembly, and can be flexibly positioned at a suitable location of the transport device to enable the turning of the object.

The transport elements can advantageously be connected to each other by means of an adjustment mechanism, and/or can be able to move toward each other in a gripping direction in order to grip the object for the purpose of turning it. According to the invention, the adjustment mechanism can have a pneumatic cylinder, and the pneumatic cylinder particularly can have quick ventilation valves. Pneumatic drives advantageously enable high drive speeds, while at the same time it is possible to achieve an elastic and resilient drive behavior. The adjustment mechanism according to the invention is therefore particularly suited for arrangement on objects being moved, such that the adjustment mechanism can be fastened directly to the transport elements. In addition, it can be advantageous that objects of different sizes and heights can be reliably received by the adjustment mechanism according to the invention. The feed of pressurized air can advantageously be supplied through a flexible tube, which can be routed through the axis of rotation of the device and to the pneumatic cylinder, by way of example.

The invention can also be configured such that the rotary device has a damper in order to dampen the movement of the transport elements toward each other, and particularly in that the damper is fastened to the frame in a manner allowing it to move with the frame. Particularly in modern devices with high transport and rotation speeds, the dampers can protect the object from the excessively strong impact with the transport elements. The dampers in this case can be moved together with the frame and therefore with the transport elements, such that in each rotary position of the transport elements, it is possible for the object to be reliably gripped while also being dampened from impacts.

According to the invention, the transport elements can be designed in the form of roller tracks. In addition, it can be contemplated that each transport element can have at least two transport rollers which can have a functional connection to each other by means of a connector belt, particularly a flat, toothed, or v-ribbed belt. Roller tracks can advantageously have a flexible design and be adapted to the spatial specifications and the size of the object. In addition, it is advantageous that such transport elements can be adapted to the weight of the object being transported. In this case, the rollers can be constructed of different materials such as steel or plastic, according to the weight of the object being transported. In addition, the receiving action and the transport capability of the roller tracks can be adjusted by means of different widths of the transport rollers. For the purpose of driving the transport rollers, which can each be connected to form pairs, by means of a connector belt, the connection to the transport drive can advantageously only be produced on one of the transport rollers. If only one transport roller is set in motion, all other transport rollers automatically move with it, because the movement is transmitted via the connector belts. As an alternative, it can be contemplated that the transport rollers can be connected to the transport drive via a gearing which can have a flat belt and a drive belt with a corresponding friction lining. As an alternative, the transport elements can be designed in the form of a hauling track having a conveyor belt and two deflector rollers. In this case, the transport drive can engage with one of the deflector rollers. As an alternative or in addition thereto, the transport drive can be arranged in one of the transport rollers and/or deflector rollers.

The transport elements can advantageously have fastener elements on both sides, clasping the transport rollers and serving to fasten the transport elements to the frame. As such, the transport elements can be designed as an integrated component together with the transport rollers. The attachment of the transport rollers on the frame can be simplified in this way, wherein the fastener elements can be mounted on the frame in a manner allowing sliding.

The invention further includes a configuration wherein the rotary drive can have a motor, and particularly a drum motor. In this case, the frame can have two rotary disks in order to clasp around the transport elements on both sides. The drum drive in this case can transmit the drive action of the motor to the frame via a flat, toothed, or v-ribbed belt. The drum drive can advantageously set into motion heavy objects with a high gear ratio and generate a high torque. As such, the device can provide improved rotation speed of the object and enable rapid conveyance of the object.

According to the invention, each rotary disk can have a guide rail which can work together with glide elements which can be arranged on the transport elements on both sides. The guide rails can advantageously serve the purpose of fastening the transport elements to the rotary disks, and also mounting the transport elements to the rotary disks on the other side in a manner allowing movement. Then, not only can the transport elements be rotated by means of the rotary disks, but they can also be moved toward and away from each other at the same time, in order to grip the object for turning and releasing it for further transport.

According to the invention, the rotary drive can have at least one spacer which can connect the rotary disks, which nevertheless no longer serves to transmit the rotary movement between the rotary disks, and which is not required to have a heavy weight. The spacer advantageously serves the purpose merely of holding the relative position of the rotary disks to each other. By means of the invention, the weight of the spacer can be advantageously reduced, thereby reducing the overall weight of the device, such that the energy required to rotate the device can be reduced.

According to the invention, the rotary drive can have two gear elements which are able to rotate about a rotary shaft by means of a rotary drive, in order to drive both rotary disks at the same time. The gearing elements can be positioned directly under the rotary disks, and can have the same distance from each other as the rotary disks. In contrast to a single-sided rotary drive, it is particularly advantageous that the rotary disks can be driven at the same time by only one rotary drive by means of the two gearing elements. In this case, the rotation speed of the frame can be increased while the rotary drive output remains constant. The rotary device in this case no longer requires any heavy connection elements in order to connect the rotary disks, and in order to transmit the rotation movement from the rotary disk on the input side to the second rotary disk which is opposite the rotary drive. The transport elements can therefore be fastened to the frame in a reliable manner, and can be mounted in the guide rails, wherein at the same time it is possible to ensure a high rotation speed of the holder device.

According to the invention, the rotary drive can have two transmission elements, particularly two flat, toothed, or v-ribbed belts, in order to transmit the action of the gearing elements to the rotary disks. The transport elements also advantageously function such that the action of the rotary drive can be transmitted evenly to both rotary disks. In contrast to a single-sided drive, the device can have a more stable, and nonetheless lighter, design, wherein the energy consumption for turning over the object can be optimized at an increasing rotary speed.

According to a special advantage of the invention, the transport drive can be able to move with the frame, and therefore with the transport elements, such that when the frame is turned, the transport elements can continue to be driven, and the object can be moved on in a transport direction. In this way, it is possible to ensure that the transport of the object is not interrupted during the turning process. As such, it is possible to increase the transport speed and to improve the performance of the device. Particularly in modern facilities with a continuous production, conveyance, and palletting of stacked sacks, it is a significant advantage to be able to ensure high capacity in order to meet ever-increasing standards and ensure profitable production speeds. Because the transport drive can be rotated together [with the frame], the functional connection between the transport drive and the transport elements must remain unbroken. Therefore, the advantage results that the transport drive can be rigidly fastened to the frame, because there is no need for the movement of the transport elements to the transport drive to be cushioned. The functional connection between the transport drive and the transport elements can advantageously be preserved during the turning process and the transport of the object. For this reason, the functional connection can be produced in a simple manner using simple components such as toothed belts and rotary wheels and/or rollers.

A slip ring can be advantageously included on the axis of rotation in order to energize the transport drive, particularly the drive motor.

The invention also proceeds from the thinking that the transport drive can have a dedicated drive device for each transport element. In this way, it is possible to achieve the advantage that both of the transport elements can be designed for the transport of the object, regardless of the rotary position. Because both transport elements can take part in the transportation of the object, it is possible to increase the transport speed, and at the same time, it is possible to reduce the drive power required for the transport. In addition, it is advantageous that the drive devices can have a smaller and lighter design.

BRIEF DESCRIPTION OF THE DRAWINGS

Additional advantages, features, and details of the invention are found in the following description, wherein multiple embodiments are described in detail with reference to the drawings. In the drawings.

DETAILED DESCRIPTION

Figure 1:
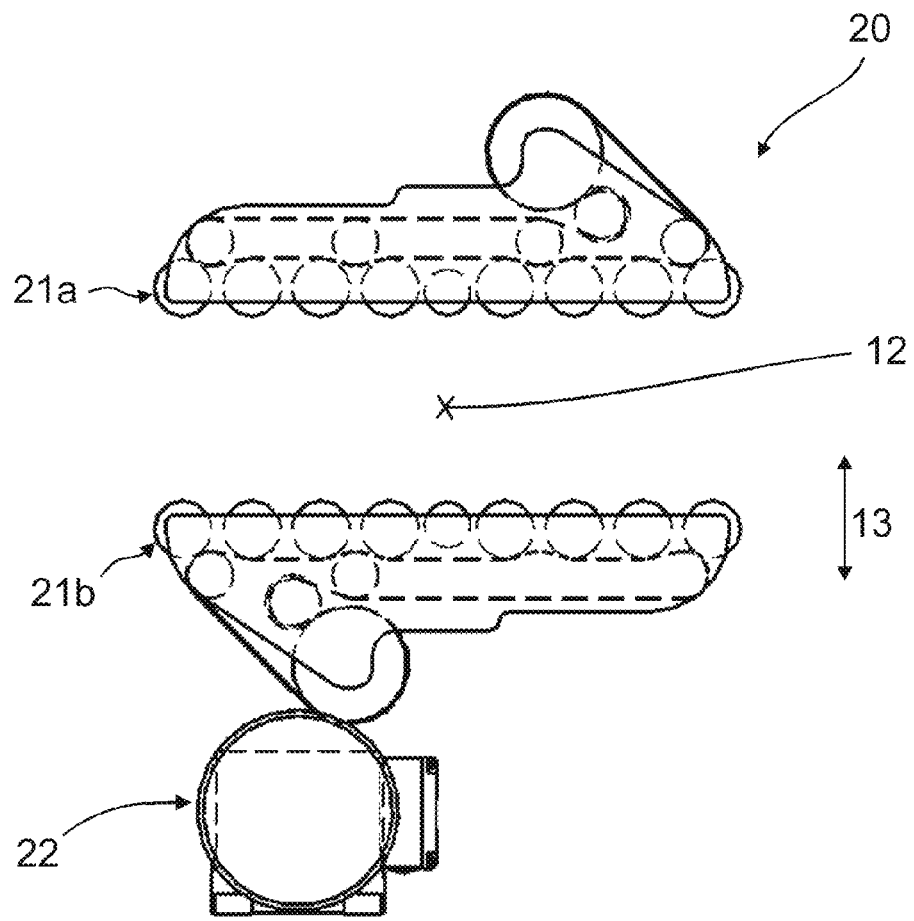
FIG. 1 shows a schematic illustration of a conventional device for turning over an object.
Figure 2:
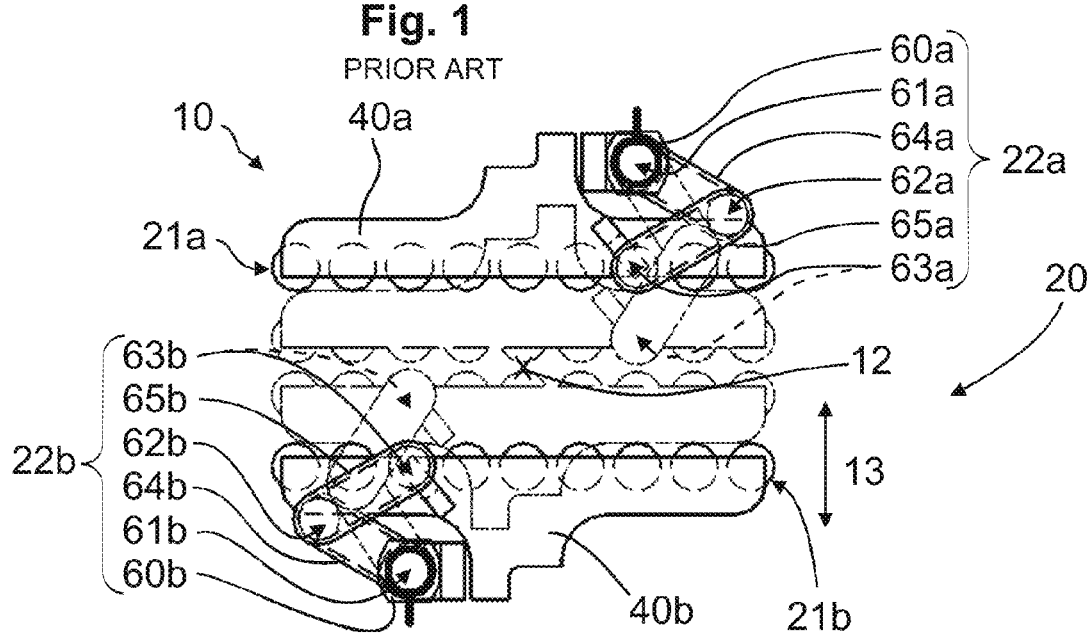
FIG. 2 shows a schematic illustration of a device according to the invention for turning over an object.

FIG. 1 shows a device for turning over an object, as is known in the prior art; and FIG. 2 shows the device 10 according to the invention, wherein details are given below of the devices and their differences. The conventional device, similarly to the device 10 according to the invention, has a holder device 20 for the purpose of receiving, turning over, and releasing an object, said holder device [20] having two height-adjustable 13 transport elements 21a, 21b for the purpose of conveying the object and one transport drive 22 for the purpose of driving the transport elements 21a, 21b, and has a rotary device 30 for the purpose of rotating the transport elements 21a, 21b about a stationary axis of rotation 12, which is described in greater detail in the context of FIGS. 7 and 8.

Figure 6:
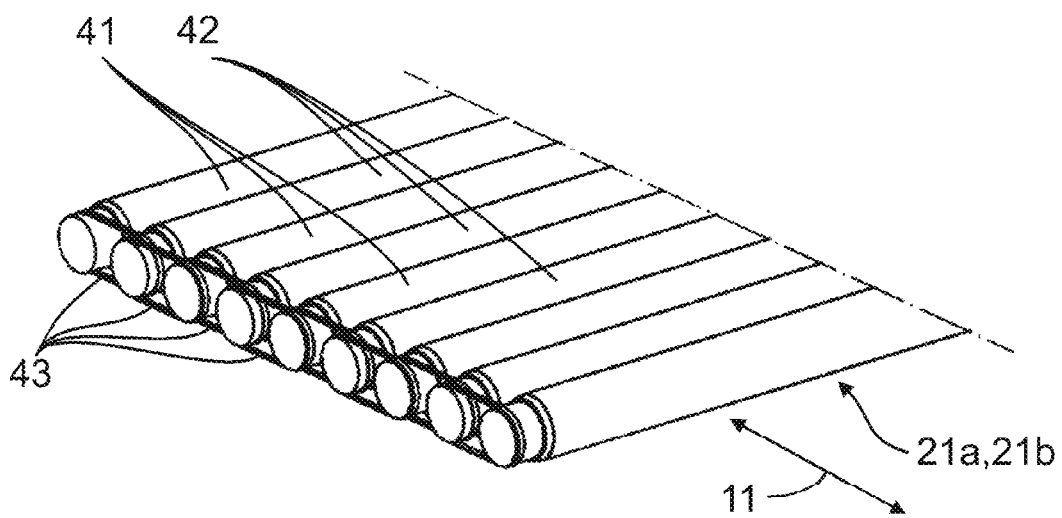
FIG. 6 shows a schematic illustration of a transport element according to the invention.
Figure 7:
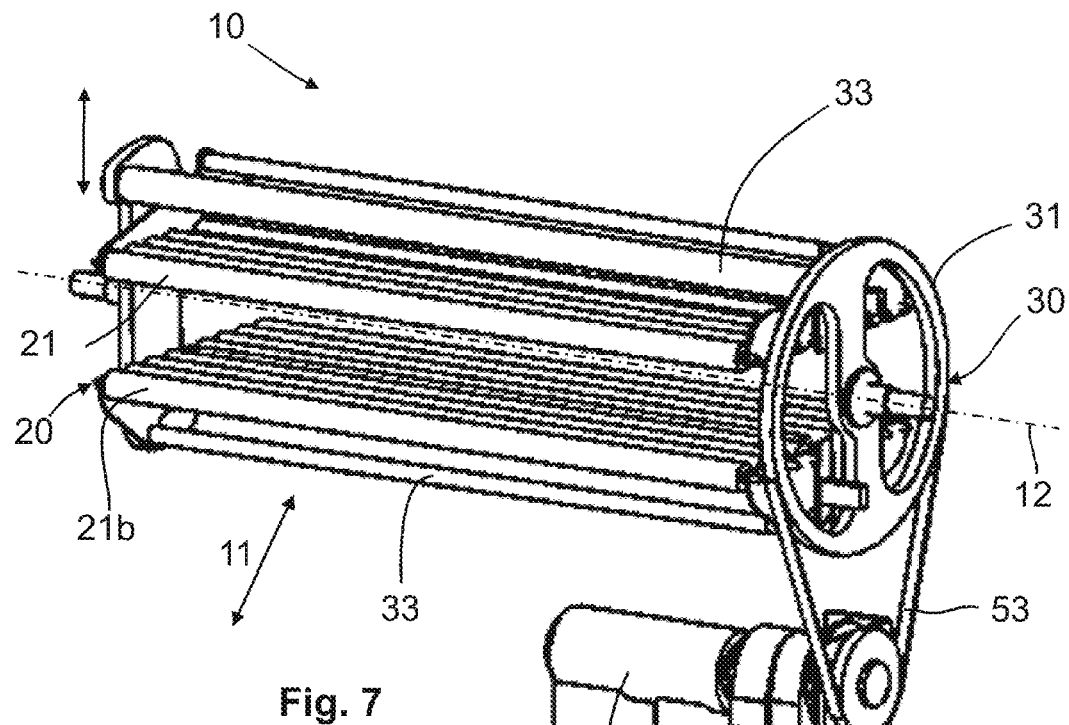
FIG. 7 shows a perspective illustration of the conventional device for turning over an object.
Figure 8:
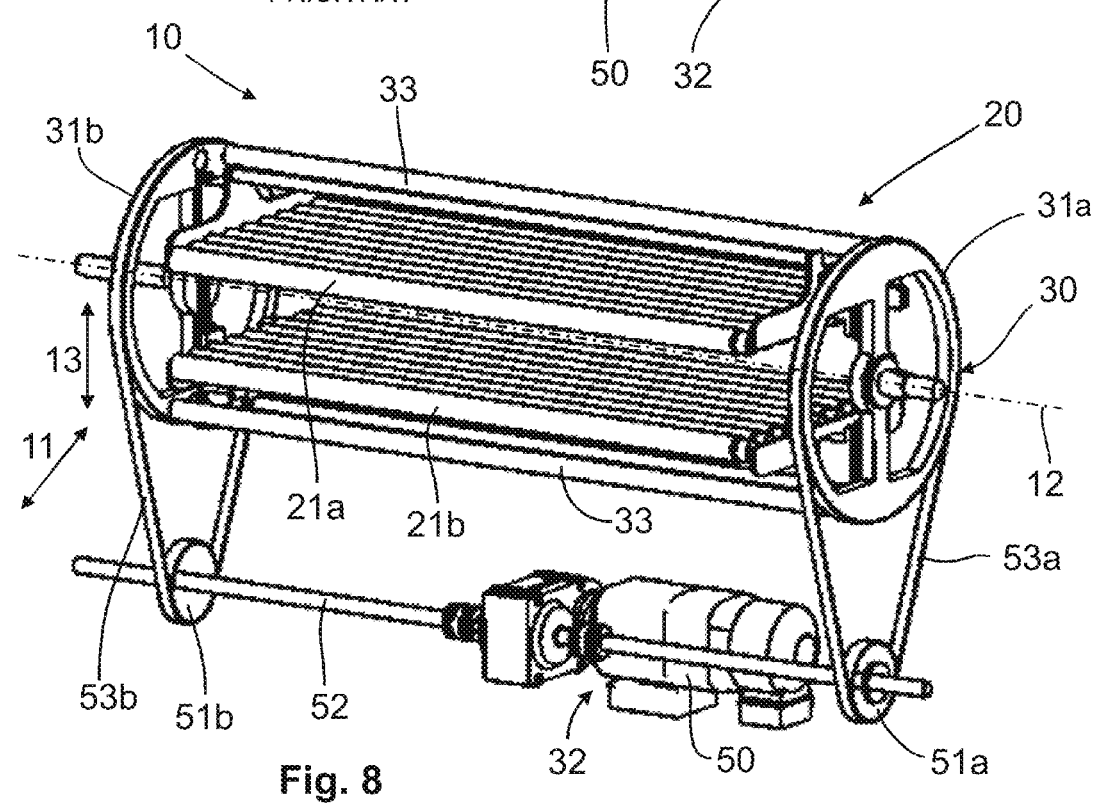
FIG. 8 shows a perspective illustration of the device according to the invention for turning over an object

The invention relates to the novel transport drive 22, as shown in FIG. 2, which in contrast to the conventional transport device 22 in FIG. 1 can move with a frame 31 of the rotary device 30, as shown in FIGS. 7 and 8, and therefore with the transport elements 21a, 21b. The concept of the invention is that when the transport elements 21a, 21b are turned over, they can continue to be driven and the object can continue to be moved in a transport direction 11, which is shown in FIG. 6. The advantage of the invention is that the transport of the object is not interrupted, even during the turning movement of the transport elements 21a, 21b.

Figure 3:
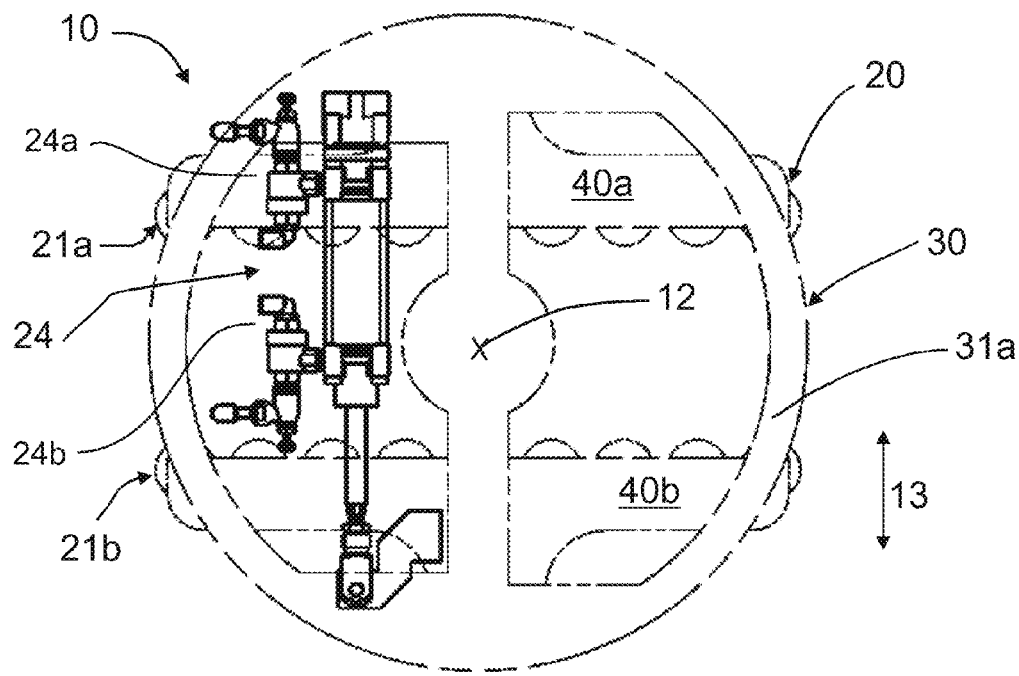
FIG. 3 shows a schematic illustration of an adjustment mechanism according to the invention.
Figure 4:
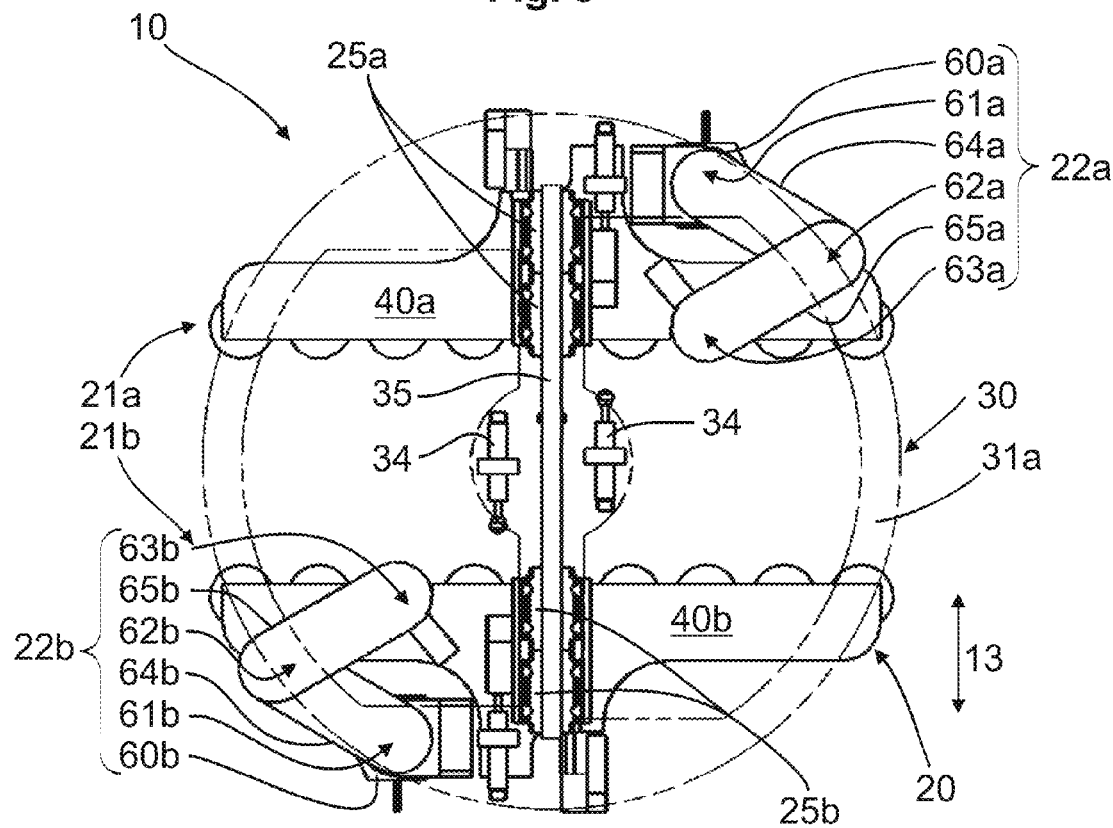
FIG. 4 shows a schematic illustration of a damper according to the invention.
Figure 5:
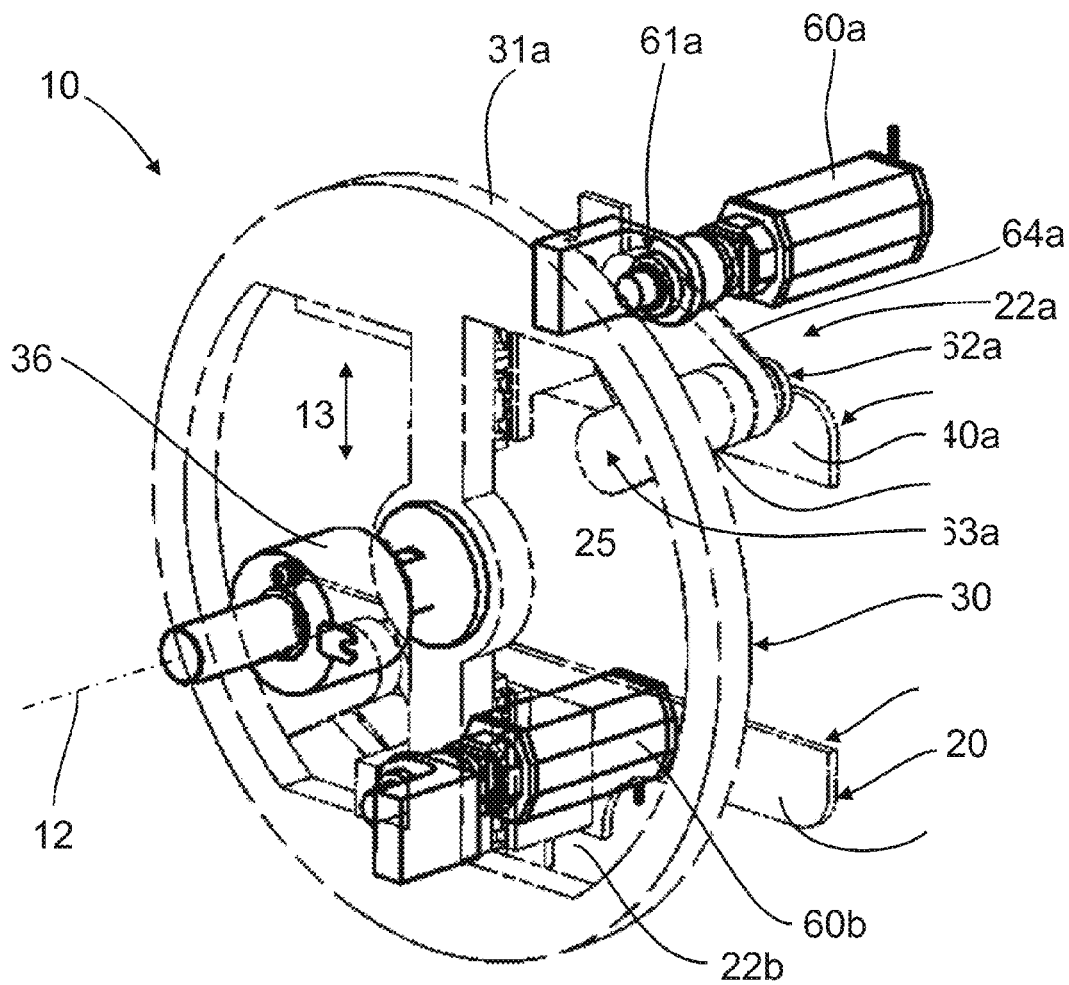
FIG. 5 shows a schematic illustration of a slip ring according to the invention.

The transport drive 22 according to the invention is rigidly fastened on the frame 31, as shown in FIGS. 4 and 5. In contrast, the transport drive 22 of the conventional device in FIG. 1 is arranged on a housing of the device, which is not illustrated, in a stationary manner. In the device in FIG. 1, only the transport elements 21a, 21b are moved toward each other in a vertical direction 13 in order to grip the object. In this case, the conventional transport drive 22 must at least partially cushion the movement of the transport elements 21a, 21b to the transport device 22 during the return movement of the transport elements 21a, 21b apart from each other, until the functional connection between the transport elements 21a, 21b and the transport drive 22 is established. In order to achieve this, the stationary transport drive 22 is normally mounted via spring on the housing of the device. In contrast to the prior art, the transport drive 22 according to the invention can be fixed to the rotary device 30 (see FIGS. 3 and 4), because the functional connection between the transport drive 22 according to the invention and the transport elements 21a, 21b is not broken even during the turning movement. The transmission of force by the conventional transport drive 22 to the transport elements 21a, 21b is realized by means of a drive wheel with a special friction insert and a corresponding flat belt on the side of the transport elements 21a, 21b, which set the transport elements 21a, 21b in motion by means of a wheel drive. In contrast, the functional connection between the transport drive 22 according to the invention and the transport elements 21a, 21b can be realized in a simple manner, and by means of both simple, and fewer, components—such as flat, toothed, or v-ribbed belts 64, 65—and can be maintained during the transporting and the turning movement of the object.

FIG. 2 shows one embodiment of the invention, wherein the transport drive 22 according to the invention can have a dedicated drive device 22a, 22b for each transport element 21a, 21b. According to this embodiment, the two drive devices 22a, 22b serves the purpose of allowing both of the transport elements 21a, 21b to transport the object regardless of their rotary position. In this way, it is possible to significantly increase the transport speed, and at the same time it is possible to reduce the drive power required by the drive devices 22a, 22b. For this reason, it is possible to use smaller and lighter drive devices 22a, 22b.

FIG. 3 shows an adjustment mechanism 24 which serves the purpose of connecting the transport elements 21a, 21b to each other and moving them towards each other in a vertical gripping direction 13, in order to grip the object for the turning. The adjustment mechanism 24 according to the invention is designed as a pneumatic cylinder 24. The pneumatic cylinder 24 in this case has quick ventilation valves 24a, 24b in order to move the transport elements 21a, 21b quickly while nevertheless achieving an elastic and resilient gripping of the object. According to the invention, the adjustment mechanism 24 is directly fastened to the transport elements 21a, 21b. The feed of pressurized air can advantageously be supplied through a flexible tube, which can be routed through the stationary axis of rotation 12 of the device and to the adjustment mechanism 24, by way of example. Dampers 34 are shown in FIG. 4 which serve the purpose of damping the movement of the transport elements 21a, 21b toward each other, and protecting the object from mechanical forces resulting from the transport elements 21a, 21b during gripping 21a, 21b. In the illustrated embodiment, the dampers 34 are fastened in a manner allowing it to move with the frame 31, and during the turning process, the dampers 34 are moved together with the transport elements 21a, 21b. FIG. 5 shows a further advantageous embodiment of the invention having a slip ring 36 which is arranged on the axis of rotation 12 in order to supply energy to the drive motors 60a, 60b of the rotatable drive devices 22a, 22b.

FIG. 6 shows one embodiment of the transport elements 21a, 21b according to the invention, which are designed in the form of roller tracks. The roller track includes multiple transport rollers 41, 42, wherein the number of transport rollers 41, 42, as well as the size and weight thereof, can be adapted to the dimensions of the object. According to the invention, the transport rollers 41, 42 can be constructed from different materials such as steel or plastic, according to the weight and size of the object being transported. Every pair of two neighboring transport rollers 41, 42 is connected together, particularly in a torque-proof manner, to a connector belt 43, in order to transmit the rotary movement from one transport roller 41, 42 to the other. The connector belt 43 can be designed as a flat, toothed, or v-ribbed belt, by way of example. According to the invention, only one of the transport rollers 41, 42 is set into motion (see FIGS. 2 and 4); the rotary movement is transmitted to all the other transport rollers 41, 42 via the connector belt 43.

The transport elements 21a, 21b are, as shown in FIGS. 2 to 5, arranged by both ends in a rotatable manner on fastener elements 40a, 40b which clasp around the transport rollers 41, 42 and also serve the purpose of fastening the transport elements 21a, 21b to the rotary device 30. FIG. 4 shows that the fastener elements 40a, 40b in this case are mounted on the frame 31 of the rotary device 30, along a guide rail 35, in a manner allowing sliding. The frame 31 of the rotary device 30 has two rotary disks 31a, 31b which are shown in more detail in FIG. 8. Each of the rotary disks 31a, 31b in this case is designed with a guide rail 35 for the purpose of mounting the transport elements 21a, 21b by both ends in a manner allowing sliding. Each guide rail 35 works together, according to the invention, with glide elements 25a, 25b which are arranged on the fastener elements 40a, 40b of the transport elements 21a, 21b. According to the invention, the transport elements 21a, 21b are not only rotated by means of the rotary disks 31a, 31b, but also can be moved toward and away from each other at the same time along arrow 13, in order to grip the object for the purpose of turning and releasing it for further transport.

The drive devices 22a, 22b according to the invention each have a drive wheel 61a, 61b which is driven by its own drive motor 60a, 60b, and a deflector wheel 62a, 62b, in order to transmit the action of the drive motor 60a, 60b to the corresponding transport element 21a, 21b via a transmission wheel 63a, 63b. According to the invention, the drive devices 22a, 22b have a jointed design, with a joint in the deflector wheel 62a, 62b. The drive motor 60a, 60b is rigidly fastened to the frame 31, wherein the drive force is transmitted by the articulated drive devices 22a, 22b to transport elements 21a, 21b which are arranged on the frame 31 in a manner allowing movement. In this way, a configuration is achieved wherein the object can be moved farther on in the transport direction 11 during the gripping movement and during the rotation of the object.

The drive wheel 61a, 61b in this case is fastened in a rotary manner to the corresponding rotary disk 31a, 31b. In contrast, the transmission wheel 63a, 63b is fastened on the transport element 21a, 21b and can move with the transport element 21a, 21b. In this case, the deflector wheel 62a, 62b is at least partially carried along with the transport element 21a, 21b. According to the invention, the deflector wheel 62a, 62b is able to move freely, and has a mechanical functional connection to only the drive wheel 61a, 61b and the transmission wheel 63a, 63b. The drive wheel 61a, 61b, the deflector wheel 62a, 62b, and the transmission wheel 63a, 63b in this case form a type of jointed arrangement having two legs between the drive wheel 61a, 61b and the deflector wheel 62a, 62b and between the deflector wheel 62a, 62b and the transmission wheel 63a, 63b, with the joint in the deflector wheel 62a, 62b. The drive devices 22a, 22b are opened and/or closed toward and away from each other upon the movement of the transport elements 21a, 21b in the joint on the deflector wheel 62a, 62b. The drive force in this case is nevertheless reliably transmitted from the drive wheel 61a, 61b to the deflector wheel 62a, 62b and from the deflector wheel 62a, 62b to the transmission wheel 63a, 63b. As a result, a configuration is achieved wherein the transport elements 21a, 21b have a functional connection to the corresponding transport drive 60a, 60b in each position on the guide rails 35, and the transport rollers 41, 42 transport the object.

According to the invention, the transmission wheel 63a, 63b can engage directly with a transport roller 41, 42. These transport rollers 41, 42 then transmit the rotary movement to a neighboring transport roller 41, 42 by means of the connection element 43, and thereby set the respective roller track in motion. As such, one of the transport rollers 41, 42 serves as a part of the drive device 22a, 22b. In contrast to the conventional device in FIG. 1, the device 10 according to the invention requires fewer components and gearing elements, which can be seen in FIGS. 1 and 2.

Each drive wheel 61a, 61b according to the invention, as shown in FIGS. 2, 4, and 5, is connected to the deflector wheel 62a, 62b by means of a first drive belt 64a, 64b, and the deflector wheel 62a, 62b is connected to the transmission wheel 63a, 63b by means of a second drive belt 65a, 65b. The first and the second drive belts 64, 65 can be designed in the form of a flat, toothed, or v-ribbed belt, by way of example. The drive belts 64, 65 stay in their position flush with the wheels 62, 63, 64 permanently, and maintain the mechanical functional connection from the drive motor 60a, 60b to the transport elements 21a, 21b during the entire process, independently of the position of the transport elements 21a, 21b on the frame 31. Because the transport elements 21a, 21b are also driven during the turning motion, it is possible to significantly increase the transport speed of the object and to improve the performance of the device. For this purpose, the drive devices 22a, 22b are rotated together with the transport elements 21a, 21b during the turning movement.

FIGS. 7 and 8 show a conventional rotary device 32 and a rotary device 30 according to the invention. Both devices have a rotary drive 32 with a motor 50, which is designed as a drum motor. The conventional rotary drive 32 in FIG. 7 only acts on one side of the holder device 20, and the rotary device 30 in FIG. 7 only has one rotary disk 31 and one transmission element 53 for the purpose of transmitting the drive force of the motor 50 to only one side of the holder device 20. In contrast, the rotary device 30 according to the invention is designed with a rotatable frame 31 which has two rotary disks 31a, 31b to clasp the holder device 20 from two sides. The special advantage of the invention is that the rotary drive 32 according to the invention drives the frame 31 on both sides thereof The rotary drive 32 according to the invention, which is shown in FIG. 8, engages with the frame 31 via two rotary disks 31a, 31b which clasp the transport elements 21a, 21b on both sides. For this purpose, the rotary drive 32 has two gearing elements 51a, 51b which are mounted about a rotary shaft 52 in a manner allowing rotation, said rotary shaft [52] extending parallel to the axis of rotation 12 of the transport elements 21a, 21b. The rotary shaft 52 is driven by the motor 50 and transmits the rotary movement to the two gearing elements 51a, 51b. The gearing elements 51a, 51b in turn are connected to the two rotary disks 31*a*, 31*b* and drive them via two transport elements 53*a*, 53*b*, for example in the form of flat, toothed, or v-ribbed belts about the axis of rotation 12. Compared to the conventional, one-sided rotary drive 32 in FIG. 7, it is particularly advantageous that both rotary disks 31*a*, 31*b* are actively driven by only the rotary drive 32 in order to transmit the rotary movement evenly to the holder device 20. As such, the rotation of the transport elements 21*a*, 21*b* can be stabilized at the same output. In this case, the transport elements 21*a*, 21*b* can be held more reliably on the rotary disks 31*a*, 31*b* at higher rotation speed than in the device in FIG. 7. The conventional rotary device in FIG. 7 requires heavy connection elements 33 in order to transmit the rotation movement from only one side to the side of the transport elements 21*a*, 21*b* which faces away from the rotary drive. In addition, the danger exists in the conventional device in FIG. 7 that the transport elements 21*a*, 21*b* can deflect out of the connection points with the frame 30, which are opposite the drive, due to their inertia. According to the invention, the device 10 in FIG. 8, in contrast, does not need any torsion-proof connection elements 33, because the rotation movement is transmitted to the transport elements 21*a*, 21*b* from two sides. The transport elements 21*a*, 21*b* are therefore reliably held on the frame 31 during the rotational movement, wherein at the same time it is possible to ensure a high rotation speed of the holder device 20. In addition, it is advantageous that, in contrast to a one-sided rotary drive 32, the rotary device 30 according to the invention can have a more stable, but nevertheless lighter, design.

The features of the embodiment of the invention described in the context of FIGS. 2 to 6 and 8 can be combined with each other, and it can be contemplated that the device 10 in FIG. 8 can be designed with a transport drive 22, as shown in FIGS. 2 to 5, and vice-versa. The transport drive 22 can have one dedicated drive device 22*a*, 22*b* for each transport element 21*a*, 21*b*. In addition, it can be contemplated that a conveyor belt can be used in place of a roller track as in FIG. 6. As an alternative to the embodiment in FIG. 8, the rotary drive 32 can have a dedicated drive device for each rotary disk 31*a*, 31*b*.

The invention claimed is:

1. A device for turning over an object comprising:
  a holder device adapted to receive, turn, and release the object, comprising two transport elements adapted to convey the object, a first and second drive wheel,
  and a rotary device comprising a damper, wherein the rotary device is adapted to rotate the two transport elements about a stationary axis of rotation, comprising a rotatable frame with two rotary disks for a two-sided attachment of the two transport elements,
  wherein the two transport elements are fastened to the rotatable frame, wherein the rotary device has a rotary drive which drives the rotatable frame on both sides, and wherein a first of the two transport elements is functionally connected to the first drive wheel via a first drive belt and a second of the two transport elements is functionally connected to the second drive wheel via a second drive belt.

2. The device according to claim 1, wherein the holder device has a transport drive comprising the first and second drive wheel which is adapted to drive the transport elements.

3. The device according to claim 1, wherein the transport elements are connected to each other via an adjustment mechanism adapted to move the transport elements toward each other.

4. The device to claim 3, wherein the adjustment mechanism comprises a pneumatic cylinder, and the pneumatic cylinder comprises quick ventilation valves.

5. The device according to claim 1, wherein the damper is fastened to the frame and is adapted to dampen the movement of the transport elements toward each other.

6. The device according to claim 1, wherein the transport elements are designed in the form of a roller track, wherein each of the transport elements comprises at least two-transport rollers which are functionally connected to each other via a connector belt comprising a flat, toothed, or v-ribbed belt.

7. The device according to claim 6, further comprising fastener elements on both sides of each of the two transport elements, wherein the transport elements are fastened to the frame via said fastener elements.

8. The device according to claim 1, wherein the rotary drive comprises a drum motor.

9. The device according to claim 1, wherein each of the two rotary disks has a guide rail which works together with glide elements which are arranged on both sides of the transport elements.

10. The device according to claim 1, wherein the rotary drive comprises at least one spacer which connects the rotary disks.

11. The device according to claim 1, wherein the rotary drive comprises two gear elements which are adapted to rotate about a rotary shaft and to drive both rotary disks.

12. The device according to claim 11, wherein the rotary drive has two transmission elements, comprising two flat, toothed, or v-ribbed belts, adapted to transmit an action of the gear elements to the rotary disks.

13. The device according to claim 1, wherein a transport drive comprising said first and second drive wheel is fastened on the frame.

14. The device according to claim 1, wherein the transport drive comprises one drive device for each transport element.

15. A device for turning over an object comprising:
  a holder device adapted to receive, turn and release the object comprising:
  two transport elements adapted to convey the object;
  a rotary device adapted to rotate the two transport elements about a stationary axis of rotation, the rotary device comprising:
  a rotary drive,
  a rotatable frame comprising two rotary disks attached to each side of the two transport elements, the two transport elements being fastened to the rotatable frame; and
  a damper in order to dampen the movement of the two transport elements toward each other, and wherein the damper is fastened to the rotatable frame, and wherein each rotary disk has a guide rail which works together with glide elements which are arranged on both sides of the transport elements.

16. The device according to claim 15, wherein the holder device comprises a transport drive adapted to drive the two transport elements.

17. The device according to claim 15, wherein the two transport elements are connected to each other via an adjustment mechanism, and are adapted to move the transport elements toward each other.

18. The device according to claim 17, wherein the adjustment mechanism comprises a pneumatic cylinder, and the pneumatic cylinder comprises quick ventilation valves.

19. The device according to claim 15, wherein the two transport elements are designed in the form of a roller track, wherein each of the transport elements comprises at least two transport rollers which are functionally connected to each other via a connector belt comprising a flat, toothed, or v-ribbed belt.

20. The device according to claim 15, further comprising fastener elements on both sides of each of the two transport elements, wherein the transport elements are fastened to the frame via said fastener elements.

21. The device according to claim 15, wherein the rotary drive comprises a drum motor.

22. The device according to claim 15, wherein the rotary drive comprises at least one spacer which connects the rotary disks.

23. The device according to claim 15, wherein the rotary drive comprises two gear elements which are adapted to rotate about a rotary shaft and to drive both rotary disks.

24. The device according to claim 23, wherein the rotary drive has two transmission elements, comprising two flat, toothed, or v-ribbed belts, adapted to transmit an action of the gear elements to the rotary disks.

25. The device according to claim 15, wherein a transport drive comprising a first and second drive wheel is fastened on the frame.

26. The device according to claim 15, wherein the transport drive comprises one drive device for each transport element.

27. A device for turning over an object comprising:
a holder device adapted to receive, turn, and release the object, comprising two transport elements adapted to convey the object;
and a rotary device adapted to rotate the transport elements about a stationary axis of rotation comprising:
a rotatable frame with two rotary disks for a two-sided attachment of the two transport elements,
a rotary drive adapted to drive the frame on both sides,
two gear elements, wherein the rotary drive is positioned between the two gear elements and
a damper in order to dampen the movement of the transport elements toward each other, and wherein the damper and the transport elements are fastened to the frame.

28. The device according to claim 27, wherein the holder device has a transport drive comprising a first and second drive wheel which is adapted to drive the transport elements.

29. The device according to claim 27, wherein the transport elements are connected to each other via of an adjustment mechanism adapted to move the transport elements toward each other.

30. The device according to claim 29, wherein the adjustment mechanism comprises a pneumatic cylinder, and the pneumatic cylinder comprises quick ventilation valves.

31. The device according to claim 27, wherein the transport elements are designed in the form of a roller track, wherein each of the transport elements comprises at least two transport rollers which are functionally connected to each other via of a connector belt comprising a flat, toothed, or v-ribbed belt.

32. The device according to claim 31, further comprising fastener elements on both sides of each of the two transport elements, wherein the transport elements are fastened to the frame via said fastener elements.

33. The device according to claim 27, wherein the rotary drive comprises a drum motor.

34. The device according to claim 27, wherein each of the two rotary disks comprises a guide rail which works together with glide elements which are arranged on both sides of the transport elements.

35. The device according to claim 27, wherein the rotary drive comprises at least one spacer which connects the rotary disks.

36. The device according to claim 27, wherein the rotary drive has two transmission elements, comprising two flat, toothed, or v-ribbed belts, adapted to transmit an action of the gear elements to the rotary disks.

37. The device according to claim 27, wherein a transport drive comprising a first and second drive wheel is fastened on the frame.

38. The device according to claim 27, wherein the transport drive comprises one drive device for each transport element.

* * * * *